United States Patent
Yang et al.

(10) Patent No.: US 8,873,841 B2
(45) Date of Patent: Oct. 28, 2014

(54) METHODS AND APPARATUSES FOR FACILITATING GESTURE RECOGNITION

(75) Inventors: Jun Yang, Milpitas, CA (US); Hawk-Yin Pang, San Jose, CA (US); Zhigang Liu, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 726 days.

(21) Appl. No.: 13/091,901

(22) Filed: Apr. 21, 2011

(65) Prior Publication Data

US 2012/0272194 A1 Oct. 25, 2012

(51) Int. Cl.
- *G06K 9/62* (2006.01)
- *G06F 3/0346* (2013.01)
- *G06K 9/00* (2006.01)
- *G06K 9/22* (2006.01)
- *G06F 3/01* (2006.01)
- *G06K 9/70* (2006.01)

(52) U.S. Cl.
CPC ............ *G06F 3/017* (2013.01); *G06F 3/0346* (2013.01); *G06K 9/00355* (2013.01); *G06K 9/22* (2013.01); *G06K 9/70* (2013.01)
USPC ........... 382/159; 382/115; 382/118; 382/181; 382/209

(58) Field of Classification Search
USPC ........................... 382/115, 118, 159, 181, 209
See application file for complete search history.

(56) References Cited

U.S. PATENT DOCUMENTS

| | | | |
|---|---|---|---|
| 5,280,265 A | 1/1994 | Kramer et al. | |
| 5,757,360 A | 5/1998 | Nitta et al. | |
| 5,809,171 A * | 9/1998 | Neff et al. | 382/209 |
| 6,072,467 A | 6/2000 | Walker | |
| 6,075,895 A * | 6/2000 | Qiao et al. | 382/218 |
| 6,108,033 A * | 8/2000 | Ito et al. | 348/152 |
| 6,771,277 B2 * | 8/2004 | Ohba | 345/629 |
| 6,788,809 B1 * | 9/2004 | Grzeszczuk et al. | 382/154 |
| 6,937,742 B2 * | 8/2005 | Roberts et al. | 382/100 |
| 6,950,534 B2 * | 9/2005 | Cohen et al. | 382/103 |
| 7,030,861 B1 * | 4/2006 | Westerman et al. | 345/173 |
| 7,340,077 B2 * | 3/2008 | Gokturk et al. | 382/103 |

(Continued)

FOREIGN PATENT DOCUMENTS

EP   1 731 995 A2   12/2006

OTHER PUBLICATIONS

*Gesture and Sign Language in Human-Computer Interaction*, Wachsmuth, I. et al., International Gesture Workshop, Bielefeld, Germany, (1997); *Velocity Profile Based Recognition of Dynamic Gestures With Discrete Hidden Markov Models* by Hofmann, F. G. et al., pp. 81-95.

(Continued)

*Primary Examiner* — Jayesh A Patel
(74) *Attorney, Agent, or Firm* — Alston & Bird LLP

(57) ABSTRACT

Methods and apparatuses are provided for facilitating gesture recognition. A method may include constructing a matrix based at least in part on an input gesture and a template gesture. The method may further include determining whether a relationship determined based at least in part on the constructed matrix satisfies a predefined threshold. In an instance in which the relationship does not satisfy the predefined threshold, the method may also include eliminating the template gesture from further consideration for recognition of the input gesture. In an instance in which the relationship satisfies the predefined threshold, the method may further include determining a rotation matrix based at least in part on the constructed matrix.

20 Claims, 12 Drawing Sheets

(56) References Cited

U.S. PATENT DOCUMENTS

| | | | |
|---|---|---|---|
| 7,899,772 B1 | 3/2011 | Brerton et al. | |
| 7,953,246 B1* | 5/2011 | Tu et al. | 382/103 |
| 7,957,554 B1* | 6/2011 | Silver et al. | 382/103 |
| 8,059,917 B2* | 11/2011 | Dumas et al. | 382/294 |
| 8,341,558 B2* | 12/2012 | Li | 715/863 |
| 2003/0149803 A1 | 8/2003 | Wilson | |
| 2005/0190973 A1* | 9/2005 | Kristensson et al. | 382/229 |
| 2006/0067573 A1* | 3/2006 | Parr et al. | 382/154 |
| 2007/0177804 A1* | 8/2007 | Elias et al. | 382/188 |
| 2008/0071540 A1* | 3/2008 | Nakano et al. | 704/251 |
| 2008/0174550 A1* | 7/2008 | Laurila et al. | 345/158 |
| 2008/0180243 A1* | 7/2008 | Aaron | 340/540 |
| 2008/0192005 A1 | 8/2008 | Elgoyhen et al. | |
| 2008/0205769 A1* | 8/2008 | Taguchi et al. | 382/209 |
| 2009/0052785 A1* | 2/2009 | Shamaie | 382/209 |
| 2009/0103780 A1* | 4/2009 | Nishihara et al. | 382/103 |
| 2009/0141937 A1* | 6/2009 | Abe | 382/103 |
| 2009/0265671 A1* | 10/2009 | Sachs et al. | 715/863 |
| 2010/0095773 A1 | 4/2010 | Shaw et al. | |
| 2010/0225443 A1 | 9/2010 | Bayram et al. | |
| 2011/0066984 A1* | 3/2011 | Li | 715/863 |
| 2011/0148770 A1* | 6/2011 | Adamson et al. | 345/173 |
| 2012/0027263 A1* | 2/2012 | Liu et al. | 382/107 |
| 2012/0194505 A1* | 8/2012 | Beck | 345/419 |
| 2012/0254809 A1 | 10/2012 | Yang et al. | |
| 2012/0294520 A1* | 11/2012 | Mei et al. | 382/164 |

OTHER PUBLICATIONS

International Search Report and Written Opinion for Application No. PCT/FI2012/050315 dated Jul. 10, 2012.

He, Z., *A New Feature Fusion Method for Gesture Recognition Based on 3D Accelerometer*, Pattern Recognition (CCPR), 2010 Chinese Conference On, IEEE, Piscataway, NJ, Oct. 21, 2010, 5 pages.

Prisacariu, V. A. et al., *Robust 3D Hand Tracking for Human Computer Interaction*, Automatic Face & Gesture Recognition and Workshops (FG 2011), 2011 IEEE International Conference on, IEEE, Mar. 21, 2011, pp. 368-375.

Horn, B. K. P., *Closed-Form Solution of Absolute Orientation Using Unit Quaternions*, Optical Society of America, vol. 4, (1987), pp. 692-642.

Kallio, S. et al., *Visualization of Hand Gestures for Pervasive Computing Environments*, AVI '06, (2006), pp. 480-483.

Keir, P. et al., *Gesture-Recognition With Non-Referenced Tracking*, IEEE Computer Society, Proceedings of the 2006 IEEE Symposium on 3D User Interfaces, (2006), pp. 151-158.

Kela, J. et al., *Accelerometer-Based Gesture Control for a Design Environment*, Pers Ubiquit Comput, 10, (2006), pp. 285-299.

Liu, J. et al., *uWave: Accelerometer-Based Personalized Gesture Recognition and Its Applications*, IEEE, (2009), p. 1-9.

McKnight, J., *Investigating an Intergrated Inertial Gesture Recognition System and Vibrotactile Display*, (a thesis, University of Dublin, Trinity College), May 2006, 83 pages.

Niezen, G. et al., *Evaluating and Optimising Accelerometer-Based Gesture Recognition Techniques for Mobile Devices*, IEEE AFRICON, (2009), pp. 1-6.

Pylvanainen, T., *Accelerometer Based Gesture Recognition Using Continuous HMMs*, J.S. Marques et al., (Eds.): IbPRIA (2005), LNCS 3522, pp. 639-646.

Ruiz, J. et al., *User-Defined Motion Gestures for Mobile Interaction*, CHI (2011), 10 pages.

DoubleFlip [online] [retrieved Apr. 7, 2011]. Retrieved from the Internet: <URL: http://portal.acm.org/citation.cfm?id=1866265&dl=ACM&coll=DL&CFID=1417442&CFTOKEN=11212156>. 3 pages.

Protractor3D [online] [retrieved Apr. 7, 2011]. Retrieved from the Internet: <URL: http://portal.acm.org/citation.cfm?id=1943468&dl=ACM&coll=DL>. 3 pages.

International Search Report and Written Opinion for Application No. PCT/FI2012/050251 dated Oct. 25, 2012.

Hofmann, F. G. et al., *Velocity Profile Based Recognition of Dynamic Gestures With Discrete Hidden Markov Models*, Department of Computer Science, Technical University of Berlin, (1997), pp. 81-95.

Payne, J. et al., *3motion: Untethered 3D Gesture Interaction*, Digital Design Studio, Glasgow School of Art, (2005), 1 page.

Botasso, C. L., *Three-Dimensional Rotations*, Politecnico di Milano, Dipartimento de Ingegneria Aerospaziale, available at https://web.archive.org/web/20060603050506/http://www.aeropolimi.it/~bottasso/bacheca_mv2/imf.pdf (archived. Jun. 3, 2008) pp. 1-42.

Kota, S. R. et al., *Principal Component Analysis for Gesture Recognition Using SystemC*, Artcom '09, Proceedings of the 2009 International Conference on Advances in Recent Technologies in Communication and Computing(2009) pp. 732-737.

Martyjarvi et al., *Recognizing Human Motion With Multiple Acceleration.Sensors*, IEEE Int. Conference on Systems, Man and Cybernetics, vol. 3494 (2001) pp. 747-752.

Smith, L., *A Tutorial on Principal Components Analysis*, University of Bremen, available at http://nyx-www.informatik.uni-bremen.de/664/1/smith_tr_02.pdf (2001) pp. 1-26.

Office Action for U.S. Appl. No. 13/077,008 dated Aug. 29, 2014.

\* cited by examiner

METHODS AND APPARATUSES FOR FACILITATING GESTURE RECOGNITION

TECHNOLOGICAL FIELD

Example embodiments of the present invention relate generally to user interface technology and, more particularly, relate to methods and apparatuses for facilitating gesture recognition.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

The evolution in the power and affordability of mobile computing devices has included the release of computing devices including enhanced user interface technologies. One such user interface technology is control of a device by making a motion gesture. In this regard, some devices include an accelerometer sensor, gyroscope, or the like that can sense vibrations, orientations, and other motion movement of a mobile device. Some applications use this motion movement as a source of user input in addition to or in lieu of traditional keyboard, touch screen, and voice input. For example, gestures have been proposed for use in remotely controlling a television or media player, navigating user interfaces, launching favorite applications, and playing mobile games. However, to date, implementation of gesture recognition technology and use of gestures as a form of user input has been somewhat limited due to difficulties in recognizing gesture inputs.

BRIEF SUMMARY

Methods, apparatuses, and computer program products are herein provided for facilitating gesture recognition. Methods, apparatuses, and computer program products in accordance with various embodiments may provide several advantages to computing devices, computing device users, hardware developers, and application developers. Some example embodiments advantageously improve gesture recognition by reducing the dependence on a device's orientation when the gesture was input. In this regard, some example embodiments determine a rotation matrix between an input gesture and a template gesture and rotate the template gesture to a coordinate system of the input gesture to facilitate recognition of the input gesture. Further, some example embodiments apply one or more filters to eliminate template gestures from further consideration for recognition of an input gesture prior to applying a gesture recognition classifier to determine whether the input gesture matches a respective template gesture. Application of these filters may reduce the rate of false gesture recognition. Further, application of such filters may reduce computational complexity and power consumption required for gesture recognition, as the number of calculations performed may be reduced by filtering out one or more template gestures prior to applying a gesture recognition classifier to determine whether the input gesture matches a respective template gesture. Accordingly, some example embodiments may improve user experience through reduction of false gesture recognition without requiring extensive power consumption or onerous hardware requirements that would be impractical on mobile devices.

In a first example embodiment, a method is provided, which may comprise constructing a matrix based at least in part on an input gesture and a template gesture. The method of this example embodiment may further comprise determining whether a relationship determined based at least in part on the constructed matrix satisfies a predefined threshold. In an instance in which the relationship does not satisfy the predefined threshold, the method of this example embodiment may also comprise eliminating the template gesture from further consideration for recognition of the input gesture. In an instance in which the relationship satisfies the predefined threshold, the method of this example embodiment may further comprise determining a rotation matrix based at least in part on the constructed matrix.

In another example embodiment, an apparatus comprising at least one processor and at least one memory storing computer program code is provided. The at least one memory and stored computer program code may be configured, with the at least one processor, to cause the apparatus of this example embodiment to at least construct a matrix based at least in part on an input gesture and a template gesture. The at least one memory and stored computer program code may be configured, with the at least one processor, to further cause the apparatus of this example embodiment to determine whether a relationship determined based at least in part on the constructed matrix satisfies a predefined threshold. The at least one memory and stored computer program code may be configured, with the at least one processor, to also cause the apparatus of this example embodiment, in an instance in which the relationship does not satisfy the predefined threshold, to eliminate the template gesture from further consideration for recognition of the input gesture. The at least one memory and stored computer program code may be configured, with the at least one processor, to further cause the apparatus of this example embodiment, in an instance in which the relationship satisfies the predefined threshold, to determine a rotation matrix based at least in part on the constructed matrix.

In another example embodiment, a computer program product is provided. The computer program product of this example embodiment includes at least one computer-readable storage medium having computer-readable program instructions stored therein. The program instructions of this example embodiment may comprise program instructions configured to cause an apparatus to perform a method. The method of this example embodiment may comprise constructing a matrix based at least in part on an input gesture and a template gesture. The method of this example embodiment may further comprise determining whether a relationship determined based at least in part on the constructed matrix satisfies a predefined threshold. In an instance in which the relationship does not satisfy the predefined threshold, the method of this example embodiment may also comprise eliminating the template gesture from further consideration for recognition of the input gesture. In an instance in which the relationship satisfies the predefined threshold, the method of this example embodiment may further comprise determining a rotation matrix based at least in part on the constructed matrix.

In another example embodiment, an apparatus is provided that may comprise means for constructing a matrix based at least in part on an input gesture and a template gesture. The apparatus of this example embodiment may further comprise means for determining whether a relationship determined based at least in part on the constructed matrix satisfies a predefined threshold. The apparatus of this example embodiment may also comprise means for, in an instance in which the relationship does not satisfy the predefined threshold, eliminating the template gesture from further consideration for recognition of the input gesture. The apparatus of this example embodiment may further comprise means for, in an instance in which the relationship satisfies the predefined threshold, determining a rotation matrix based at least in part on the constructed matrix.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
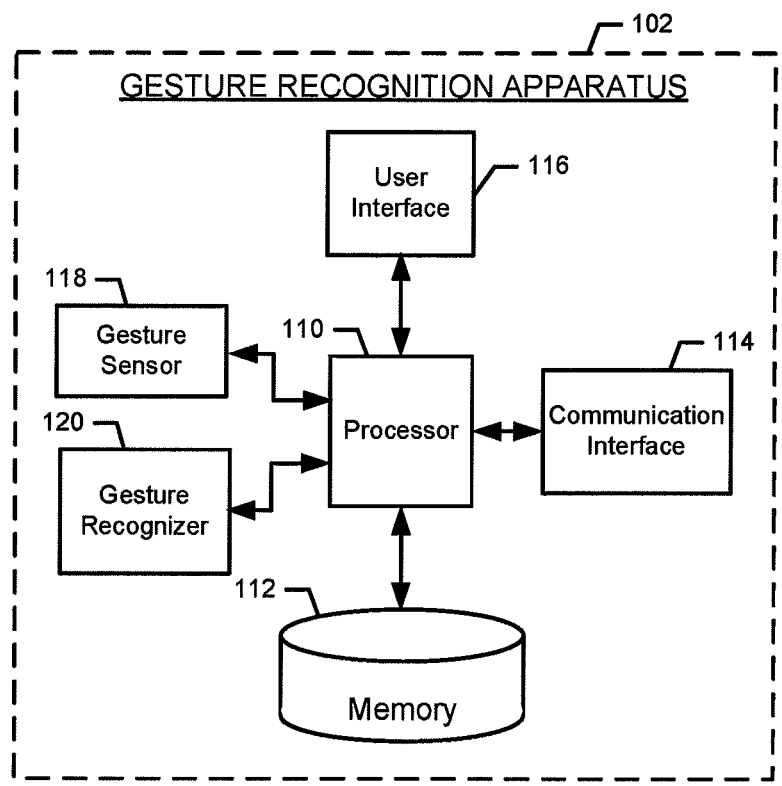
Figure 2:
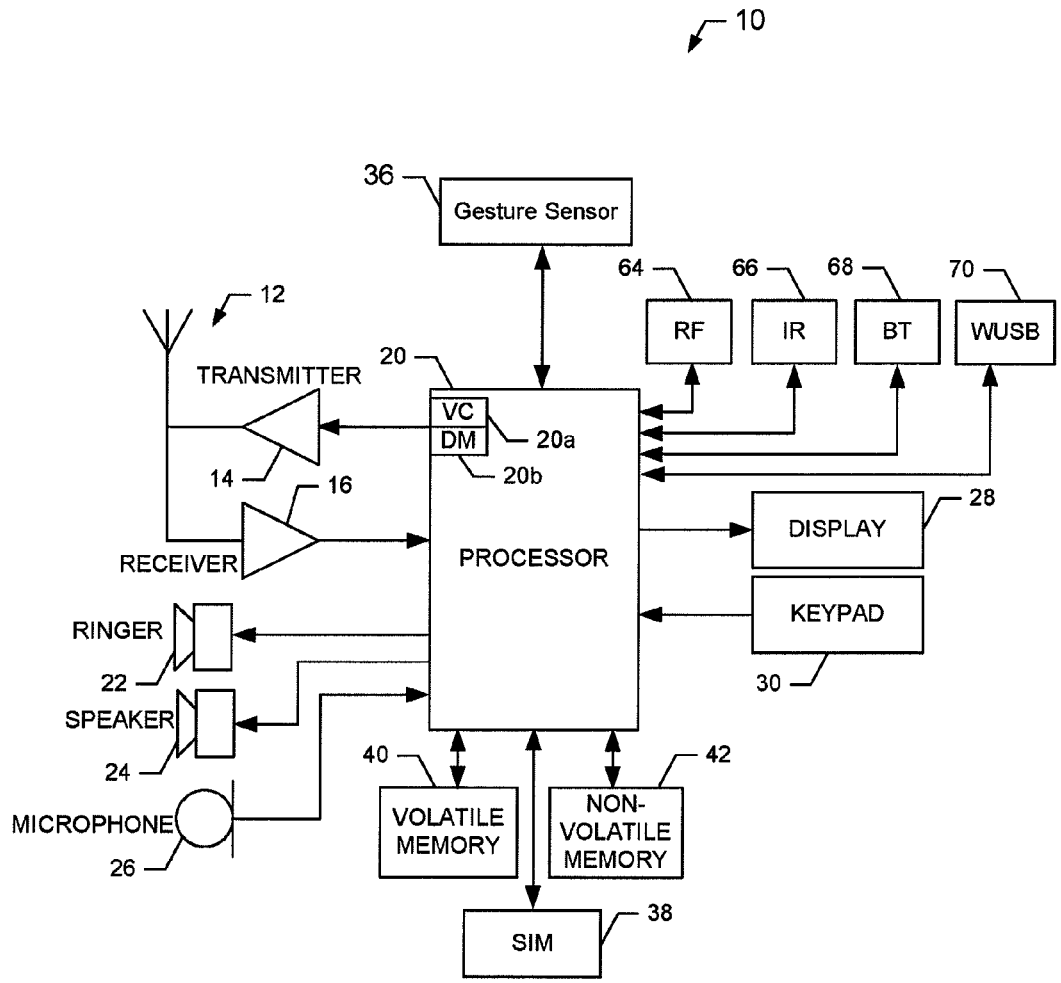
Figure 3:
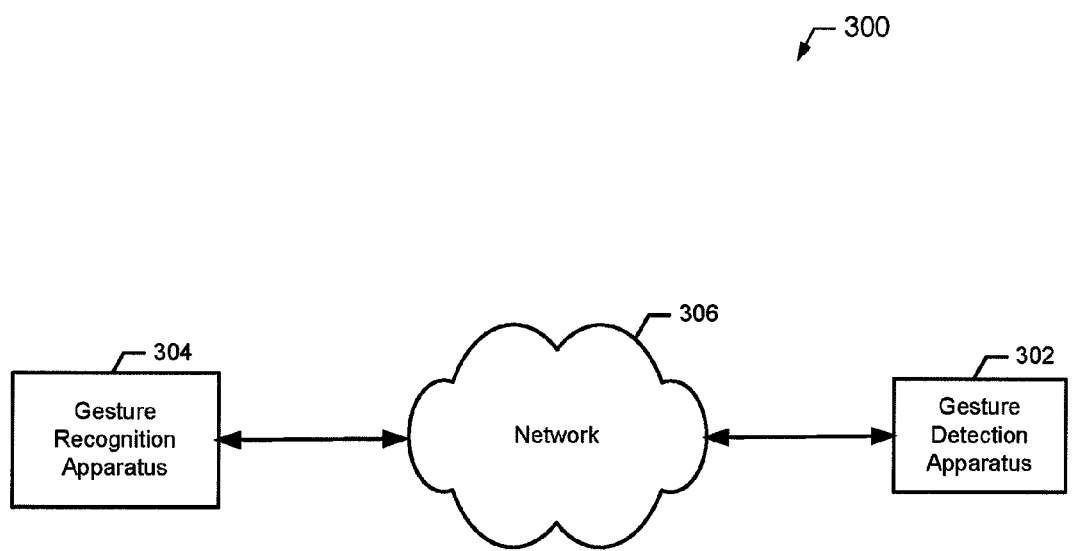
Figure 4:
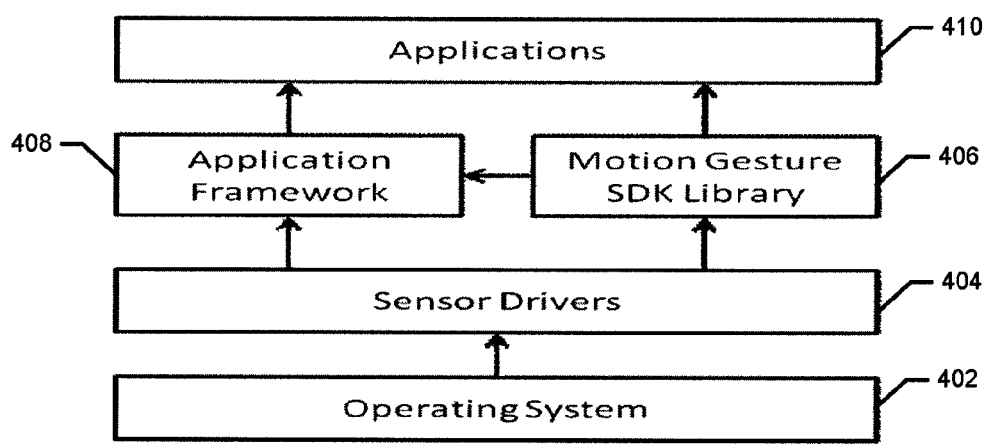
Figure 5:
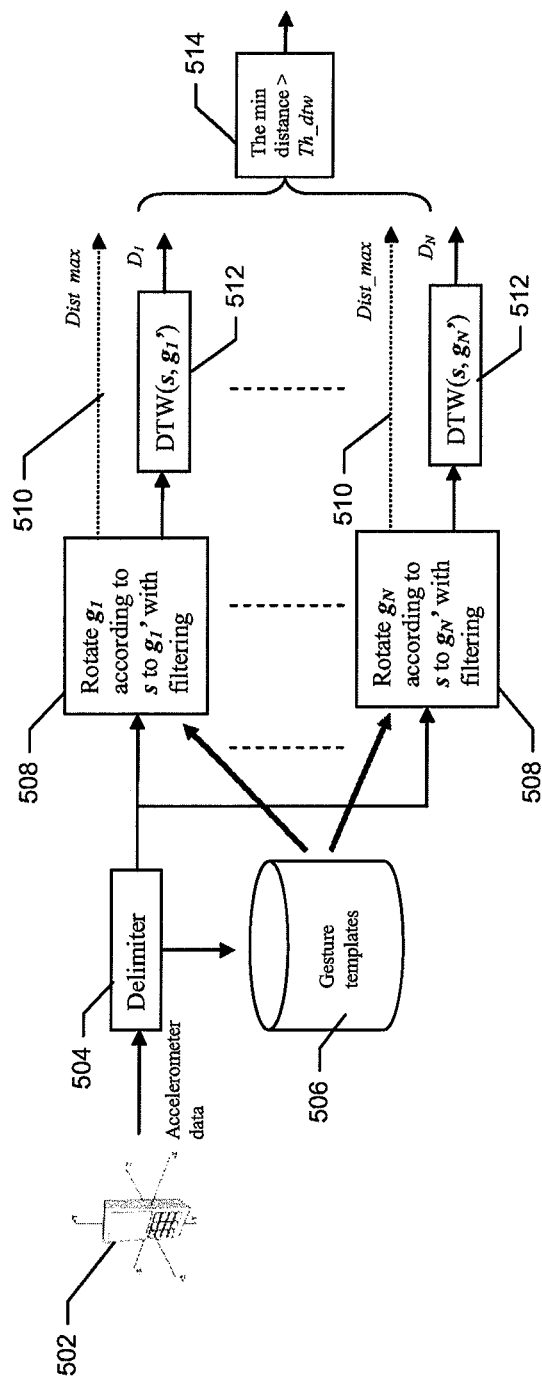
Figure 6A:
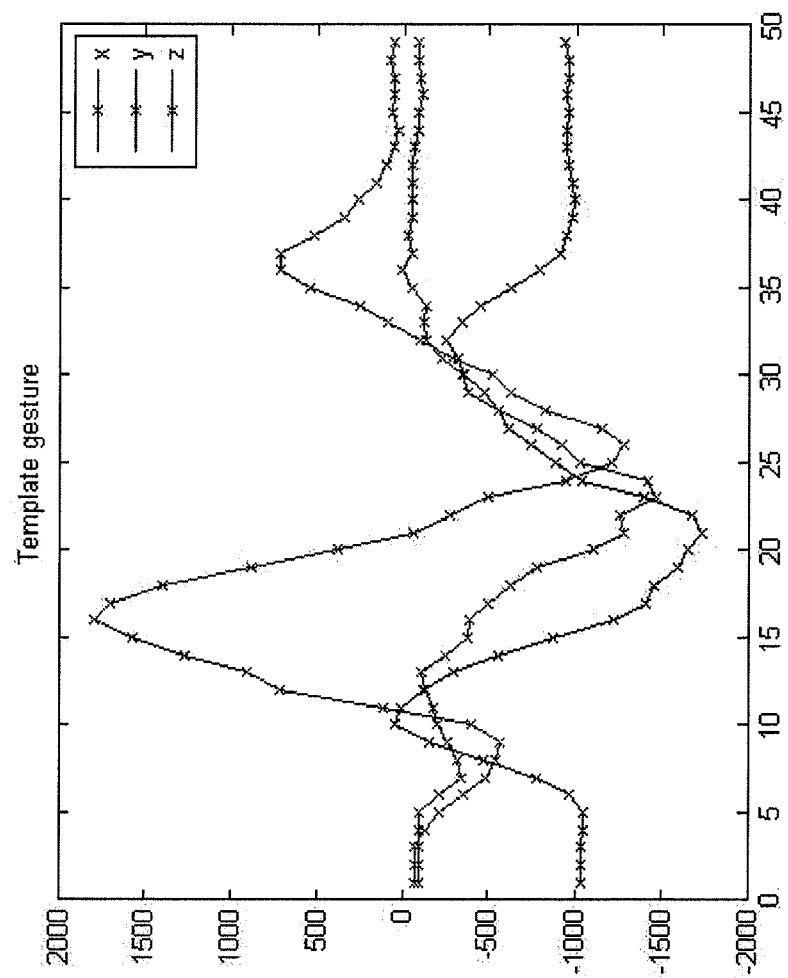
Figure 6B:
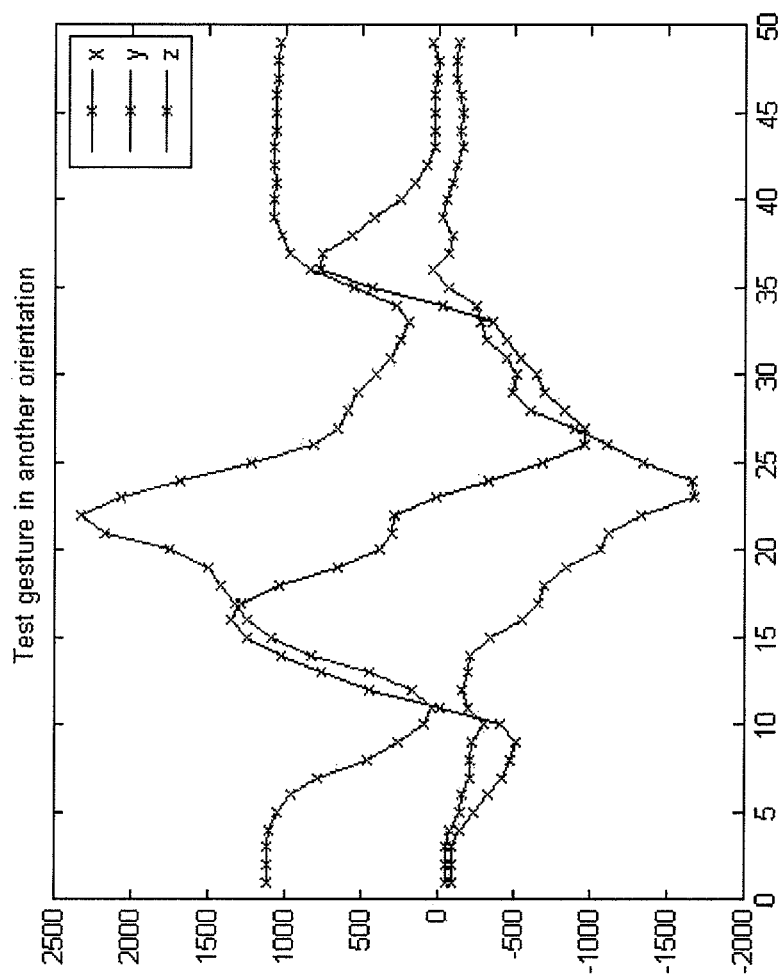
Figure 6C:
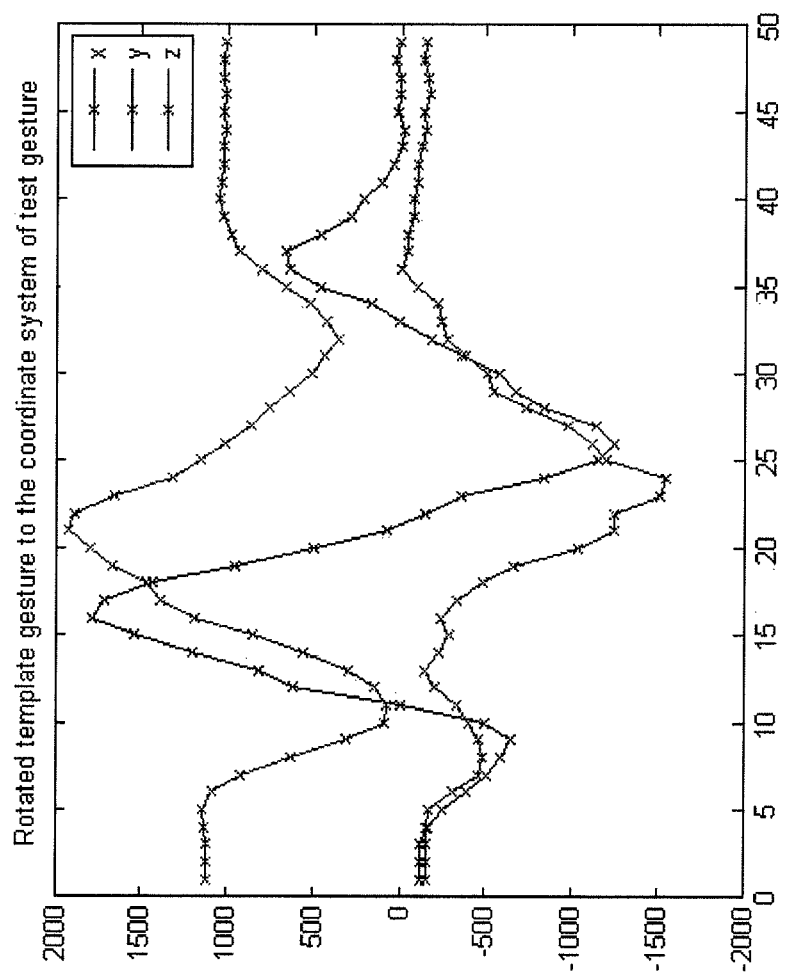
Figure 7:
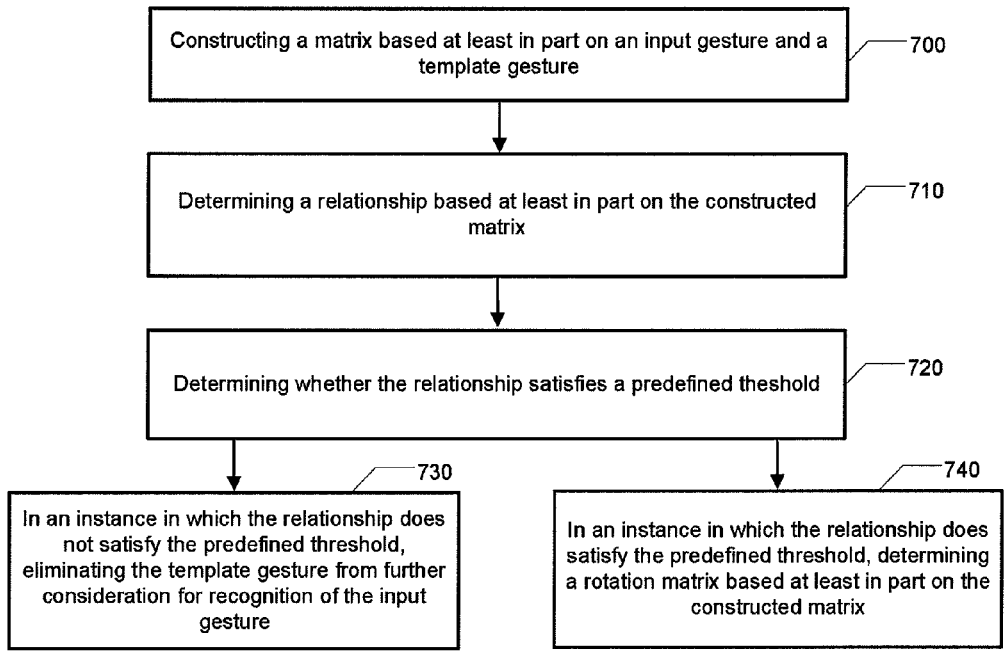
Figure 8:
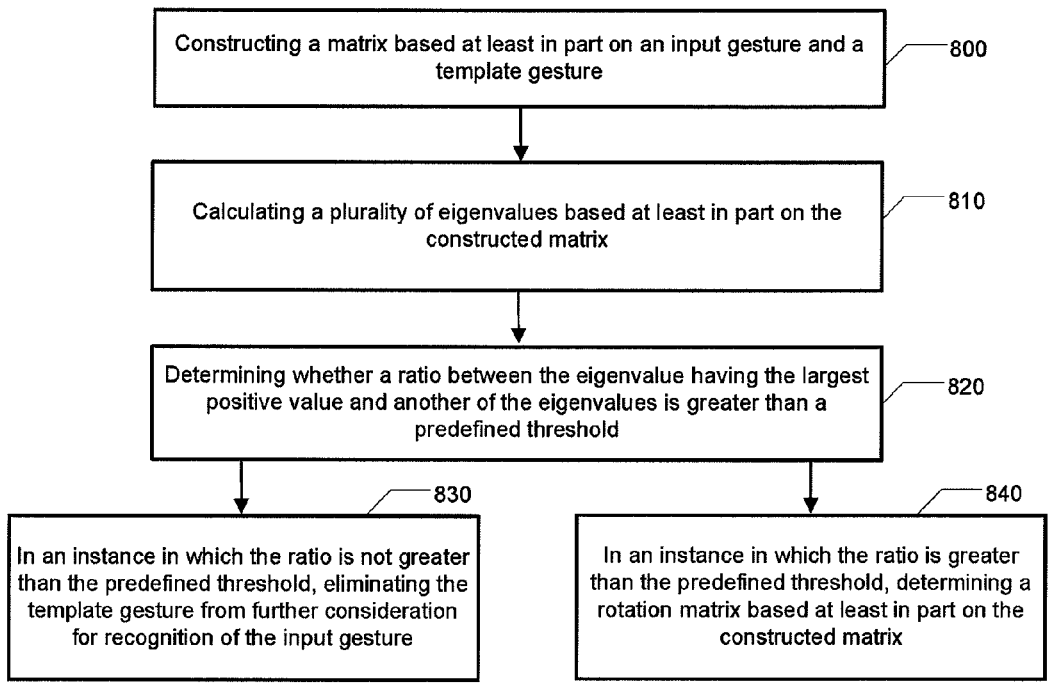
Figure 9:
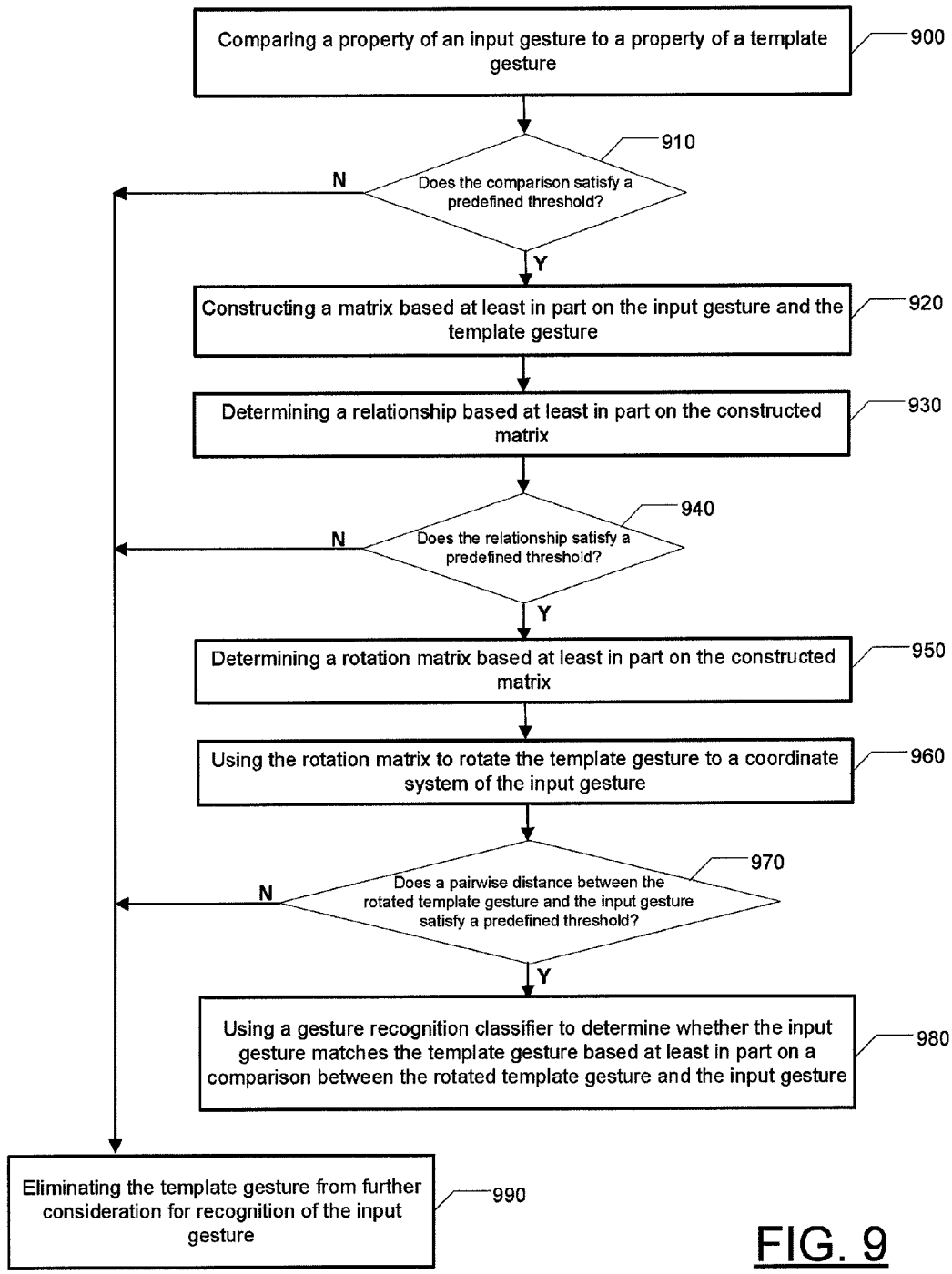
Figure 10:
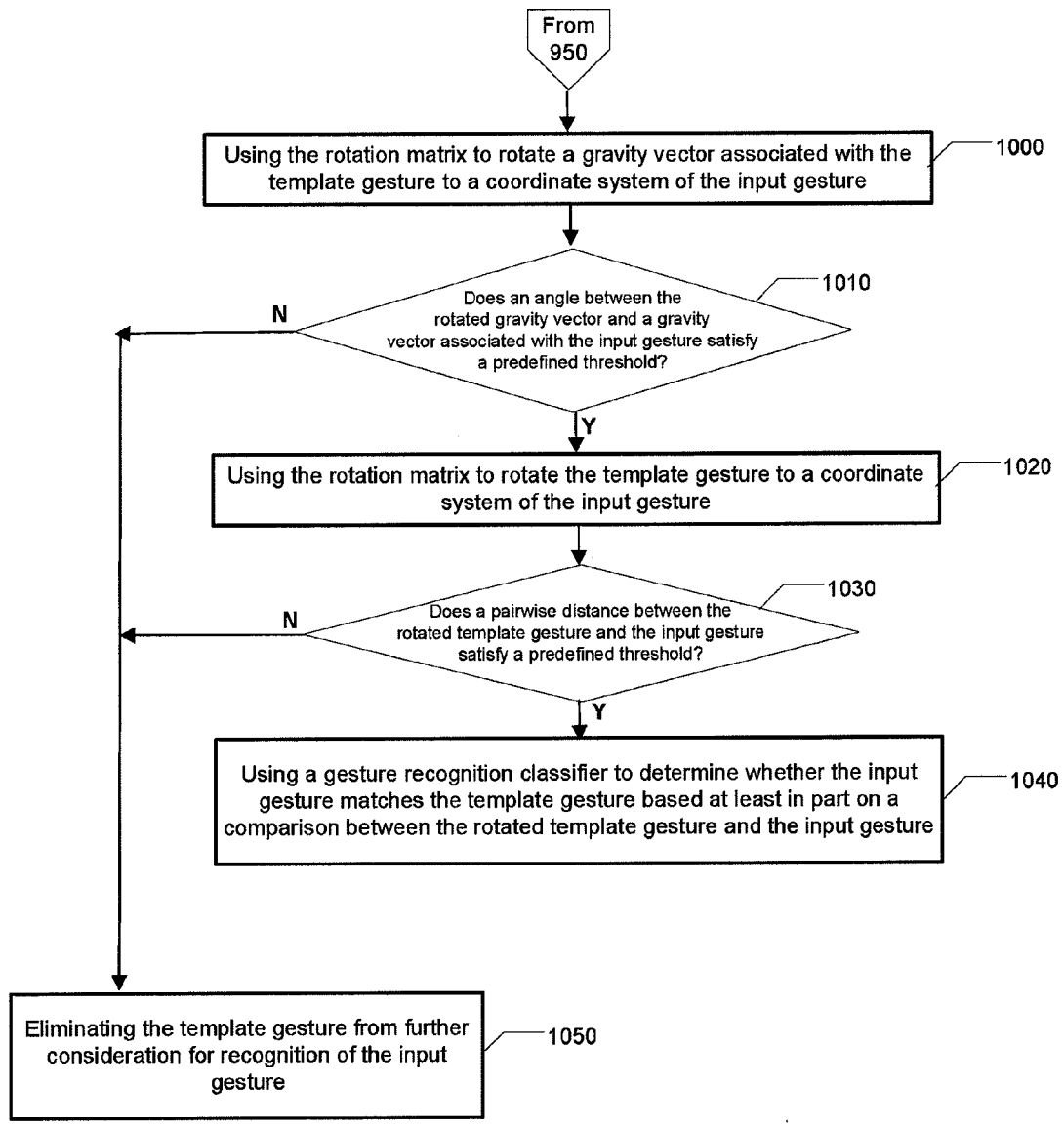

Having thus described embodiments of the invention in general terms, reference will now be made to the accompanying drawings, which are not necessarily drawn to scale, and wherein:

FIG. 1 illustrates a block diagram of a gesture recognition apparatus according to some example embodiments;

FIG. 2 is a schematic block diagram of a mobile terminal according to some example embodiments;

FIG. 3 illustrates a system for facilitating gesture recognition according to some example embodiments;

FIG. 4 illustrates a software layer implementation for facilitating gesture recognition according to some example embodiments;

FIG. 5 illustrates an example process flow for facilitating gesture recognition according to some example embodiments;

FIGS. 6a-6c illustrate an example rotation of a template gesture to a coordinate system of an input gesture in accordance with some example embodiments;

FIG. 7 illustrates a flowchart according to an example method for facilitating gesture recognition according to some example embodiments;

FIG. 8 illustrates a flowchart according to another example method for facilitating gesture recognition according to some example embodiments;

FIG. 9 illustrates a flowchart according to a further example method for facilitating gesture recognition according to some example embodiments; and FIG. 10 illustrates a flowchart according to yet another example method for facilitating gesture recognition according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Currently, there are several technical issues that may hinder the recognition of gesture inputs, which are delaying development and implementation of hardware and software applications utilizing gesture inputs. One such technical issue is that accelerometer signals are dependent on a device's current orientation. This means that if a user or developer trains a gesture (e.g. creates a gesture template) when the device is held facing forward, the user will have to ensure that all the following input gestures must be performed with the same orientation (facing forward). However, when a user repeats a gesture at different times in different places, the user may not perform the gesture in the exact same orientation as the template. This technical barrier greatly reduces the user-friendliness of implementation of motion gestures on computing devices.

A second technical issue is the need for high recognition rates with low false alarm conditions to provide an acceptable user experience. Since many proposed simple and socially acceptable motion gestures are not always distinguishable from everyday movement of handheld mobile devices, gestures performed and recognized using existing technologies will inherently trigger larger number of false alarms in daily usage of the mobile device. Accordingly, the scope of usage and device control using motion gestures is currently limited.

A third technical issue is the computing power limitation of mobile devices. The recognition algorithm has to be low in computational complexity and light weight in memory usage. Otherwise, the motion recognition engine can occupy the majority of processor resources and consume large power of the device's battery. Accordingly, the regular operations of mobile devices may be negatively impacted.

Some example embodiments facilitate gesture recognition while addressing one or more of these technical issues. For example, some example embodiments address the first technical issue by using a method of absolute orientation to find a specific rotation matrix between an input gesture and a template gesture. The template gesture may then be rotated in its Cartesian coordinate system to the input gesture's Cartesian coordinate system resulting in the creation of a new template gesture. A gesture recognition classifier, such as a Dynamic Time Warping (DTW) algorithm, may be applied to determine whether the new template gesture matches the input gesture. Accordingly, some example embodiments enable a user to hold a device in any orientation and perform gestures arbitrarily in a line (1D gestures), a plane (2D gestures) or space (3D gestures). As long as a gesture is repeated in a similar manner to a template gesture, the gesture recognition classifier combined with absolute orientation based rotation in accordance with some example embodiments may find a good template gesture match and perform device orientation independent motion gesture recognition.

Further, some example embodiments address the second technical issue by implementing one or more filtering techniques during the gesture recognition process to filter out one or more template gestures from a set of template gestures prior to applying the gesture recognition classifier to the filtered template gestures. Accordingly, the filters may act as admission control to reject background hand motions and thus greatly reduce the false recognition rate. Implementation of such filtering techniques may additionally address the third technical issue. In this regard, application of one or more filtering techniques during the rotation procedure may eliminate one or more template gestures from further consideration prior to completion of the rotation procedure for a given template gesture. Since absolute orientation based rotation involves some amount of computation on these filters may reduce the computational complexity to achieve orientation independency. Further, filtering out unmatched template gestures prior to application of a gesture recognition classifier may result in a significant conservation of computing power.

Referring now to FIG. 1, FIG. 1 illustrates a block diagram of a gesture recognition apparatus 102 for facilitating gesture recognition according to some example embodiments. It will be appreciated that the gesture recognition apparatus 102 is provided as an example of some embodiments and should not be construed to narrow the scope or spirit of the invention in any way. In this regard, the scope of the disclosure encompasses many potential embodiments in addition to those illustrated and described herein. As such, while FIG. 1 illustrates one example of a configuration of a gesture recognition apparatus, other configurations may also be used to implement embodiments of the present invention.

The gesture recognition apparatus 102 may be embodied as a desktop computer, laptop computer, mobile terminal, mobile computer, mobile phone, mobile communication device, game device, digital camera/camcorder, audio/video player, television device, digital video recorder, positioning device, game controller, television controller, electronic device controller, chipset, a computing device comprising a chipset, any combination thereof, and/or the like. In this regard, the gesture recognition apparatus 102 may comprise any computing device or other apparatus that is configured to facilitate gesture recognition in accordance with one or more example embodiments disclosed herein. In some example embodiments, the gesture recognition apparatus 102 is embodied as a mobile computing device, such as the mobile terminal illustrated in FIG. 2.

In this regard, FIG. 2 illustrates a block diagram of a mobile terminal 10 representative of some example embodiments of a gesture recognition apparatus 102. It should be understood, however, that the mobile terminal 10 illustrated and hereinafter described is merely illustrative of one type of gesture recognition apparatus 102 that may implement and/or benefit from various embodiments of the invention and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), future communication, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

In some example embodiments, the mobile terminal 10 may include a gesture sensor 36. The gesture sensor 36 may comprise an accelerometer, gyroscope, magnetometer, pedometer, some combination thereof, or the like. In this regard, the gesture sensor 36 may comprise an entity configured to determine a state of motion of the mobile terminal 10 and/or a property of a state of motion of the mobile terminal 10. For example, the gesture sensor 36 may be configured to detect and output data about a length in time, length in distance, rate, acceleration, direction, gravity, and/or other property of a gesture or other movement of the mobile terminal 10.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. One or more of the volatile memory 40 or non-volatile memory 42 may be embodied as a tangible, non-transitory memory. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in some example embodiments, the gesture recognition apparatus 102 includes various means for performing the various functions herein described. These means may comprise one or more of a processor 110, memory 112, communication interface 114, user interface 116, gesture sensor 118, or gesture recognizer 120. The means of the gesture recognition apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the gesture recognition apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, user interface 116, gesture sensor 118, and/or gesture recognizer 120 may be at least partially embodied as a chip or chip set. The gesture recognition apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the gesture recognition apparatus 102 as described herein. The plurality of processors may be embodied on a single computing device or distributed across a plurality of computing devices collectively configured to function as the gesture recognition apparatus 102. In embodiments wherein the gesture recognition apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the gesture recognition apparatus 102 to perform one or more of the functionalities of the gesture recognition apparatus 102 as described herein. As such, whether configured by hardware or software methods, or by a combination thereof, the processor 110 may comprise an entity capable of performing operations according to one or more example embodiments while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the gesture recognition apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the gesture recognition apparatus 102 is embodied as a mobile terminal 10, the memory 112 may comprise the volatile memory 40 and/or the non-volatile memory 42. The memory 112 may be configured to store information, data, applications, instructions, or the like for enabling the gesture recognition apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, a pre-stored set of template gestures. This stored information may be stored and/or used by the gesture sensor 118 and/or gesture recognizer 120 during the course of performing their functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the gesture recognition apparatus 102 and one or more computing devices may be in communication. By way of example, the communication interface 114 may be configured to receive data from and/or transmit data to a gesture detection apparatus 304 over a network 306, as illustrated in FIG. 3. The communication interface 114 may additionally be in communication with the memory 112, user interface 116, gesture sensor 118, and/or gesture recognizer 120, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises or is in communication with a display, the display may comprise, for example, a cathode ray tube (CRT) display, a plasma display panel (PDP), a liquid crystal display (LCD), a light-emitting diode (LED), an organic light-emitting diode display (OLED), a projector (e.g., a projector configured to project a display on a projection screen, wall, and/or other object), a holographic display, or the like. In embodiments wherein the user interface 116 comprises a touch screen display, the user interface 116 may additionally be configured to detect and/or receive an indication of a touch gesture or other input to the touch screen display. The user interface 116 may be in communication with the memory 112, communication interface 114, gesture sensor 118, and/or gesture recognizer 120, such as via a bus.

The gesture sensor 118 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In embodiments wherein the gesture sensor 118 is embodied separately from the processor 110, the gesture sensor 118 may be in communication with the processor 110. The gesture sensor 118 may further be in communication with one or more of the memory 112, communication interface 114, user interface 116, or gesture recognizer 120, such as via a bus.

In some example embodiments, the gesture sensor 118 may comprise an accelerometer, gyroscope, magnetometer, pedometer, some combination thereof, or the like. In this regard, the gesture sensor 118 may comprise an entity configured to determine a state of motion and/or a property of a state of motion of an apparatus, such as the gesture recognition apparatus 102. For example, the gesture sensor 118 may be configured to detect and output data about a length in time, length in distance, rate, acceleration, direction, gravity, and/or other property of a gesture or other movement of an apparatus. In embodiments wherein the gesture recognition apparatus 102 comprises a mobile terminal 10, the gesture sensor 118 may comprise the gesture sensor 36.

The gesture recognizer 120 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In embodiments wherein the gesture recognizer 120 is embodied separately from the processor 110, the gesture recognizer 120 may be in communication with the processor 110. The gesture recognizer 120 may further be in communication with one or more of the memory 112, communication interface 114, user interface 116, or gesture sensor 118, such as via a bus. In some example embodiments, the gesture recognizer 120 may comprise an image signal processor.

FIG. 3 illustrates a system 300 for facilitating gesture recognition according to some example embodiments. In this regard, FIG. 3 illustrates a system in which some example embodiments of the gesture recognition apparatus 102 may be implemented. The system 300 may comprise a gesture detection apparatus 302 and gesture recognition apparatus 304, which may be in communication over a network 306.

The network 306 may comprise one or more wireless networks (for example, a cellular network, wireless local area network, wireless personal area network, wireless metropolitan area network, wireless personal area network), one or more wireline networks, a wireless link (e.g., a radio link, Bluetooth link, ZigBee link, wireless universal serial bus link, Infrared data link, and/or the like or other wireless link or interface), or some combination thereof, and in some embodiments may comprise at least a portion of the internet.

The gesture detection apparatus 302 and gesture recognition apparatus 304 may each be embodied as any computing device. By way of non-limiting example, the gesture detection apparatus 302 and/or gesture recognition apparatus 304 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, game controller, television controller, electronic device controller, chipset, a computing device comprising a chipset, any combination thereof, and/or the like.

In some example embodiments, an entity implemented on the gesture detection apparatus 302 may be configured to detect motion of the gesture detection apparatus 302 (e.g., a gesture made with the gesture detection apparatus 302), and may collect information about the detected motion and convey that information to the gesture recognition apparatus 304 via the network 306. In this regard, in some example embodiments, the gesture sensor 118 may be at least partially embodied on a gesture detection apparatus 302.

The gesture recognition apparatus 304 may process the received information about the motion of the gesture detection apparatus 302 in order to recognize a gesture made with the gesture detection apparatus 302 in accordance with any of the various example embodiments disclosed herein. Accordingly, the gesture recognition apparatus 304 may comprise an embodiment of the gesture recognition apparatus 102.

As an example, the system 300 may comprise a system where a mobile control apparatus is used to control or otherwise provide user input remotely to another apparatus. For example, in one implementation of the system 300, the gesture detection apparatus 302 may comprise a motion-sensitive video game controller, and the gesture recognition apparatus 304 may comprise a video game console that may provide for game control based on gesture information received from the gesture detection apparatus 302. As another example, the gesture detection apparatus 302 may comprise a controller for a television, media player, or other consumer electronic device, and the gesture recognition apparatus 304 may comprise a respective consumer electronic device controlled by the controller, which may be configured to recognize a control gesture based on information received from the gesture recognition apparatus 304 and perform an operation based on the recognized control gesture.

As such, it will be appreciated that where a gesture, input gesture, information about a motion/gesture, data describing a gesture captured by a gesture sensor, and/or the like is discussed as being processed, segmented, recognized, and/or the like by the gesture recognizer 120 or other entity of the gesture recognition apparatus 102, the gesture or motion may comprise a gesture made with the gesture recognition apparatus 102, or may comprise a gesture made with a device that may be in communication with the gesture recognition apparatus 102, such as a gesture detection apparatus 302.

In some example embodiments, the gesture recognizer 120 may be configured to provide gesture recognition services for applications within an application framework. The application framework of some example embodiments may comprise an open application framework that may allow developers to harness gesture recognition services that may be provided by the gesture recognizer 120 to enable application-specific gesture controls. Referring now to FIG. 4, FIG. 4 illustrates a software layer implementation of an application framework for facilitating gesture recognition according to some example embodiments.

The layers may include an operating system layer 402. The operating system layer 402 may comprise and/or may serve as a base layer for implementation of one or more sensor drivers 404. The sensor drivers 404 may provide drivers for operation of the gesture sensor 118. In this regard, the sensor drivers 404 may provide drivers for a 3-axis accelerometer sensor, 3-axis gyroscope, 3-axis magnetometer and/or other sensors that may be configured to facilitate motion gesture recognition. The motion gesture software development kit (SDK) library 406 may be at least partially implemented and/or controlled by the gesture recognizer 120, and may receive motion gesture data collected by sensors under the control of the sensor drivers 404. The motion gesture SDK 406 may enable an application developer to utilize a gesture recognition application programming interface (API) to train and test motion gestures directly to their application. In addition, the application framework 408 may provide a higher abstraction layer for developer application creation. The application framework 408 may allow for higher level APIs to be created for different gesture categories while utilizing the motion gesture SDK library 406. The different gesture control categories can include categories such as mobile device user interface control (e.g. gesture shortcuts to applications or menu control), gaming, health & wellness, younger generation educational experiences, sports training assistance, and/or other applications in which motion gesture recognition can be utilized.

The gesture recognizer 120 may be configured to receive data describing an input gesture. In this regard, an input gesture may be described by motion data captured by the gesture sensor 118. The input gesture may comprise any gesture made that may impart motion to a device, such as the apparatus 102, gesture detection apparatus 302, or the like. In some example embodiments, the gesture recognizer 120 may receive a raw stream of data captured by the gesture sensor 118, which may comprise data describing multiple gestures and/or other movement of a device. In such embodiments, the gesture recognizer 120 may be configured to implement a delimiter that may be configured to segment the data stream into individual gestures. As an example, there may be a slight pause in motion at the start and/or at the end of a gesture, which may be used by the delimiter to facilitate segmentation. As another example, a user may press a button, make a touch gesture to a touch screen, or provide other input to denote the start and/or completion of a gesture. This input may be used by the delimiter to facilitate gesture segmentation. In other example embodiments, data captured by the gesture sensor 118 may be segmented into individual input gestures (e.g., by the gesture sensor 118) prior to being passed to the gesture recognizer 120. In this regard, it will be appreciated that a delimiter may be implemented by another entity, such as the gesture sensor 118) in addition to or in lieu of implementation of a delimiter by the gesture recognizer 120.

The gesture recognizer 120 may be configured to compare an input gesture to each of a plurality of predefined template gestures to attempt to find a template gesture matching the input gesture in order to facilitate recognition of the input gesture. The template gestures may, for example, be stored in the memory 112, and may have been defined by a user, application developer, device manufacturer, and/or the like. In comparing the input gesture to a template gesture, the gesture recognizer 120 may be configured to determine a rotation matrix between the input gesture and the template gesture. The gesture recognizer 120 may use the rotation matrix to rotate the template gesture to the input gesture's Cartesian coordinate system, resulting in the creation of a new rotated template gesture. The gesture recognizer 120 may apply a gesture recognition classifier to the rotated template gesture and the input gesture to determine whether the template gesture matches the input gesture. The gesture recognition classifier may comprise any appropriate classifier, such as DTW, a Hidden Markov Model (HMM), Artificial Neural Networks (ANN), or the like.

In some example embodiments, the gesture recognizer 120 may be configured to apply one or more filtering techniques such that some of the template gestures may be eliminated from further consideration prior to rotation of the template gesture and/or prior to application of the gesture recognition classifier. Accordingly, computational complexity and power consumption for gesture recognition may be reduced.

Referring now to FIG. 5, FIG. 5 illustrates an example process flow for facilitating gesture recognition using filtering according to some example embodiments. As illustrated by 502, a gesture sensor, such as the gesture sensor 118, may capture data describing motion of an apparatus. In the example of FIG. 5, the gesture sensor is illustrated by way of example as being embodied as an accelerometer, and may provide accelerometer data. However, it will be appreciated that gesture sensors other than an accelerometer may be used in addition to or in lieu of an accelerometer within the context of the example embodiment illustrated in FIG. 5. A delimiter 504 may segment the accelerometer data to determine an input gesture, denoted by the symbol s. The input gesture may be compared to a set of template gestures 506. The set of template gestures may be denoted as $g_i$, $\{i=1, 2, \ldots, N\}$. In this regard, as illustrated by the operations 508, filtering may be applied by the gesture recognizer 120 to each respective template gesture in the set of template gestures in the process of rotating a template gesture to the coordinate system of the input gesture.

If a template gesture is eliminated from further consideration by filtering, the gesture recognizer 120 may determine a distance between the eliminated template gesture and the input gesture to be "Dist_max," as illustrated by reference 510. In this regard, "Dist_max" may comprise a value that is of significant enough magnitude that the eliminated template gesture will not be determined as matching the input gesture, or may comprise a flag or other value denoting the template gesture as being eliminated. Accordingly, the gesture recognizer 120 may apply one or more filters during and/or prior to performing calculations for rotating a template gesture to a coordinate system of an input gesture. In this regard, filters may be used to eliminate some template gestures from further consideration prior to rotation of the eliminated template gestures and/or prior to application of a gesture recognition classifier to the eliminated template gestures.

If, however, a template gesture satisfies the threshold(s) of the applied filter(s), the gesture recognizer 120 may apply a gesture recognition classifier, such as a DTW algorithm, to the template gesture to calculate a distance between the input gesture and the template gesture, as illustrated by references 512. After each template gesture in the set of template gestures has been processed (e.g., either eliminated by filtering or rotated and compared to the input gesture using a gesture recognition classifier), the gesture recognizer 120 may determine the template gesture having the minimum distance to the input gesture. If the minimum distance is less than (or equal to) a threshold Th_dtw, the gesture recognizer 120 may determine that the template gesture having the minimum distance is a match to the input gesture. If, however, the minimum distance exceeds the threshold, the gesture recognizer 120 may determine that there is not a template gesture that matches the input gesture.

Having now generally described filtering and gesture recognition in accordance with some example embodiments, various filtering techniques that may be implemented in accordance with some example embodiments will now be described in more detail. In some example embodiments, the gesture recognizer 120 may compare one or more properties of a template gesture to one or more corresponding properties of the input gesture prior to rotation of the template gesture. If the comparison of the respective properties satisfies a predefined threshold(s), the gesture recognizer 120 may proceed to perform calculations for rotating the template gesture to a coordinate system of the input gesture. If, however, the comparison does not satisfy the predefined threshold(s), the gesture recognizer 120 may eliminate the template gesture from further consideration before performing further calculations for rotating the template gesture to a coordinate system of the input gesture.

Accordingly, determining whether a comparison of the properties satisfies a predefined threshold(s) may serve as a filter. The properties that may be compared may, for example, include lengths of the input gesture and the template gesture, rates of the template gesture and input gesture, acceleration of the input gesture and the template gesture, some combination thereof, or the like. The predefined threshold may, for example, comprise a value, magnitude, ratio, degree of deviation, or the like that may define an acceptable relationship between a property of the template gesture and the input gesture. In this regard, the predefined threshold may comprise a metric to ensure that a property of the template gesture does not deviate too significantly (e.g., more than an acceptable amount) from a respective property of the input gesture. If a property of the template gesture does deviate significantly from the respective property of the input gesture, the template gesture may be considered to not be a match to the input gesture, and may be eliminated from further consideration. The predefined threshold may be defined by a user, application developer, hardware developer, or the like. The predefined threshold may be defined to any appropriate value to account for a desired error tolerance range, filter sensitivity, and/or other factor.

As an example, the gesture recognizer 120 may perform the following operations to compare the length of the template gesture g to the length of the input gesture s to ensure that the difference in lengths does not exceed a predefined threshold length.

1.1 Estimate the gravity vector grav(s) from s, and grav($g_i$) form $g_i$ respectively;
1.2 If I length(s)−length($g_i$)I<max{length(s), length($g_i$)}/3
   Resample the shorter one of s and $g_i$ to max{length(s), length($g_i$)};
   Proceed with calculation for rotating $g_i$ (Go to Operation 2.1); Else
   Return Dist_max; (eliminate $g_i$ from further consideration)

In order to rotate a template gesture to the coordinate system of the input gesture, the gesture recognizer 120 may calculate a rotation matrix. These calculations may include the following operations:

2.1 Remove the mean from s and $g_i$ respectively;
2.2 Construct the 3×3 covariance matrix C between s and $g_i$;
2.3 Construct a symmetric 4×4 matrix M from nine elements of C as the following:

| | | | |
|---|---|---|---|
| M(1, 1) = C(1, 1) + C(2, 2) + C(3, 3) | M(1, 2) = C(2, 3) − C(3, 2) | M(1, 3) = C(3, 1) − C(1, 3) | M(1, 4) = C(1, 2) − C(2, 1) |
| M(2, 1) = C(2, 3) − C(3, 2) | M(2, 2) = C(1, 1) − C(2, 2) − C(3, 3) | M(2, 3) = C(1, 2) + C(2, 1) | M(2, 4) = C(3, 1) + C(1, 3) |
| M(3, 1) = C(3, 1) − C(1, 3) | M(3, 2) = C(1, 2) + C(2, 1) | M(3, 3) = −C(1, 1) + C(2, 2) − C(3, 3) | M(3, 4) = C(2, 3) + C(3, 2) |
| M(4, 1) = C(1, 2) − C(2, 1) | M(4, 2) = C(3, 1) + C(1, 3) | M(4, 3) = C(2, 3) + C(3, 2) | M(4, 4) = −C(1, 1) − C(2, 2) + C(3, 3) |

The gesture recognizer 120 may implement a filtering operation by determining whether a relationship determined based at least in part on the constructed matrix M satisfies a predefined threshold. If the relationship does not satisfy the predefined threshold, the template gesture $g_i$ may be eliminated from further consideration. If, however, the relationship does satisfy the predefined threshold, the gesture recognizer 120 may continue calculations for rotating the template gesture $g_i$ to the coordinate system of the input gesture s. Accordingly, determining whether the relationship satisfies a predefined threshold may serve as a filter for eliminating template gestures that may not be considered a potential match based on the determined relationship. The predefined threshold may, for example, comprise a value, magnitude, ratio, degree of deviation, or the like that may define an acceptable relationship. In this regard, the predefined threshold may comprise a metric to ensure that the template gesture does not deviate too significantly (e.g., more than an acceptable amount) from a respective property of the input gesture. The predefined threshold may be defined by a user, application developer, hardware developer, or the like. The predefined threshold may be defined to any appropriate value to account for a desired error tolerance range, filter sensitivity, and/or other factor.

As an example, the gesture recognizer 120 may determine whether a relationship between the largest positive eigenvalue of M and the other eigenvalues of M satisfies a predefined threshold. For example, the gesture recognizer 120 may determine whether a ratio between the largest positive eigenvalue of M and the other eigenvalues of M exceeds a predefined threshold, such as 1.5, as used by way of example, and not by way of limitation, in the following example operations that may be performed by the gesture recognizer 120:

2.4 Calculate the four eigenvalues and corresponding eigenvectors of M;
2.5 If the largest positive eigenvalue is significantly greater than the rest eigenvalues (ratio>1.5)
    Proceed with calculation for rotating $g_i$ (Go to Operation 2.6);
Else
    Return Dist_max; (eliminate $g_i$ from further consideration)

Assuming that the template gesture $g_i$ has not been eliminated from further consideration, the gesture recognizer 120 may perform the following operations to determine the rotation matrix for $g_i$ and s:

2.6 Take the eigenvector with largest positive eigenvalue as a unit quaternion Q;
2.7 Find the rotation matrix R represented by Q;

After calculating the rotation matrix, the gesture recognizer 120 may optionally perform a further filtering operation prior to rotating the template gesture to the coordinate system of the input gesture. In this regard, the gesture recognizer 120 may use the rotation matrix to rotate a gravity vector associated with the template gesture to a coordinate system of the input gesture. The gesture recognizer 120 may compare the rotated gravity vector to a gravity vector associated with the input gesture to determine whether an angle between the rotated gravity vector associated with the template gesture and the gravity vector associated with the input gesture satisfies a predefined threshold. If the angle satisfies the predefined threshold, the gesture recognizer 120 may proceed with calculations for rotating the template gesture to the coordinate system of the input gesture. If, however, the angle does not satisfy the predefined threshold, the template gesture may be eliminated from further consideration. In this regard, a template gesture may, for example, be recorded as a (gesture, gravity vector) tuple during a training and testing phase. During recognition, the gravity vector may be used as a watermark for filtering when performing recognition of an input gesture.

The predefined threshold may, for example, comprise a predefined angle, cosine value, value, or other metric that may define an acceptable angle between the rotated gravity vector associated with the template gesture and the gravity vector associated with the input gesture. In this regard, for example, if the angle between the rotated gravity vector associated with the template gesture and the gravity vector associated with the input gesture exceeds the predefined threshold value, the template gesture may be regarded as not being an acceptable candidate for a match to the input gesture, and may be eliminated from further consideration. As another example, if the predefine threshold is a cosine value, the cosine of the angle between the rotated gravity vector associated with the template gesture and the gravity vector associated with the input gesture may be calculated and compared with the threshold cosine value. If the calculated cosine value exceeds the threshold cosine value, the template gesture may be regarded as not being an acceptable candidate for a match to the input gesture, and may be eliminated from further consideration. The predefined threshold may be defined by a user, application developer, hardware developer, or the like. The predefined threshold may be defined to any appropriate value to account for a desired error tolerance range, filter sensitivity, and/or other factor.

As an example, the gesture recognizer 120 may perform the following operations to compare the gravity vector of the template gesture to the gravity vector of the input gesture:

3.1 Use R to rotate $grav(g_i)$ in the coordinate system of $g_i$ back to the coordinate system of s;
3.2 If the angle between rotated $grav(g_i)$ and $grav(s)$ is close to zero (e.g., determine whether the cos(angle) is less than a threshold cosine value, such as 0.8),
    Proceed with calculation for rotating $g_i$ (Go to Operation 3.3);
Else
    Return Dist_max; (eliminate $g_i$ from further consideration)

Assuming that the template gesture $g_i$ has not been eliminated from further consideration, the gesture recognizer 120 may rotate the template gesture to the coordinate system of the input gesture, as follows:

3.3 Use R to rotate $g_i$ back to the coordinate system of s;

The gesture recognizer 120 may perform a further filtering operation prior to using a gesture recognition classifier to compare the rotated template gesture and the input gesture. In this regard, gesture recognizer 120 may calculate a pairwise distance between the rotated template gesture and the test gesture. If the distance is less than a predefined threshold, the gesture recognizer may apply the gesture recognition classifier to the rotated template gesture and the input gesture. Otherwise, the template gesture may be eliminated from further consideration. The predefined threshold may, for example, comprise a predefined distance or other metric that may be used to ensure that the pairwise distance does not exceed an acceptable tolerance range. In this regard, if the pairwise distance is greater than the threshold, the template gesture may be considered to not be a candidate to match the input gesture, and may be eliminated from further consideration. The predefined threshold may be defined by a user, application developer, hardware developer, or the like. The predefined threshold may be defined to any appropriate value to account for a desired error tolerance range, filter sensitivity, and/or other factor. In some example embodiments, the predefined threshold may be learned from an empirical distribution of test experiments for gesture recognition.

The gesture recognizer 120 may, for example, perform the following operations to determine the pairwise distance between the rotated template gesture and the input gesture and determine whether the pairwise distance satisfies (e.g., is less than) a predefined threshold:

3.4 Add the mean of s on the rotated $g_i$ to get pre-processed $g_i'$;

4.1 Since $g_i'$ and s have the same length, calculate the pairwise Euclidian distance between them;

4.2 If the pairwise Euclidian distance is less than Th_pair (a threshold larger than Th_dtw), Go to the gesture recognition classifier (e.g., a DTW classifier);

Else

Return Dist_max; (eliminate $g_i$ from further consideration)

FIGS. 6a-6c illustrate an example rotation of a template gesture to a coordinate system of an input gesture in accordance with some example embodiments. In this regard, FIG. 6a illustrates a template gesture for drawing a gesture circle with a device oriented in the portrait position. FIG. 6b illustrates a test gesture (e.g., an input gesture) of a similar gesture circle performed with the device oriented in the landscape position. FIG. 6c illustrates the template gesture of FIG. 6a rotated to the coordinate system of the test gesture of FIG. 6b in accordance with an example embodiment. As may be seen, the rotated template gesture is substantially similar to the test gesture. In this regard, the pairwise distance between the test gesture and the rotated template gesture is 225. Application of a DTW algorithm to the test gesture and the rotated template gesture may result in a determination of an aligned distance between the test gesture and template gesture of 165.

Referring now to FIG. 7, FIG. 7 illustrates a flowchart according to an example method for facilitating gesture recognition according to some example embodiments. The operations illustrated in and described with respect to FIG. 7 may, for example, be performed by, with the assistance of, and/or under the control of one or more of the processor 110, memory 112, communication interface 114, user interface 116, gesture sensor 118, or gesture recognizer 120. Operation 700 may comprise constructing a matrix based at least in part on an input gesture and a template gesture. For example, operation 700 may comprise calculating the matrix C and/or the matrix M, as described above in Operation 2.2 and Operation 2.3. The processor 110, memory 112, and/or gesture recognizer 120 may, for example, provide means for performing operation 700. Operation 710 may comprise determining a relationship based at least in part on the constructed matrix. The processor 110, memory 112, and/or gesture recognizer 120 may, for example, provide means for performing operation 710. Operation 720 may comprise determining whether the relationship satisfies a predefined threshold. The processor 110, memory 112, and/or gesture recognizer 120 may, for example, provide means for performing operation 720. If it is determined at operation 720 that the relationship does not satisfy the predefined threshold, operation 730 may comprise eliminating the template gesture from further consideration for recognition of the input gesture. The processor 110, memory 112, and/or gesture recognizer 120 may, for example, provide means for performing operation 730. If, however, it is determined at operation 720 that the relationship does satisfy the predefined threshold, operation 740 may comprise determining a rotation matrix based at least in part on the constructed matrix. The processor 110, memory 112, and/or gesture recognizer 120 may, for example, provide means for performing operation 740.

FIG. 8 illustrates a flowchart according to another example method for facilitating gesture recognition according to some example embodiments. The operations illustrated in and described with respect to FIG. 8 may, for example, be performed by, with the assistance of, and/or under the control of one or more of the processor 110, memory 112, communication interface 114, user interface 116, gesture sensor 118, or gesture recognizer 120. Operation 800 may comprise constructing a matrix based at least in part on an input gesture and a template gesture. For example, operation 800 may comprise calculating the matrix C and/or the matrix M, as described above in Operation 2.2 and Operation 2.3. The processor 110, memory 112, and/or gesture recognizer 120 may, for example, provide means for performing operation 800. Operation 810 may comprise calculating a plurality of eigenvalues based at least in part on the constructed matrix. The processor 110, memory 112, and/or gesture recognizer 120 may, for example, provide means for performing operation 810. Operation 820 may comprise determining whether a ratio between the eigenvalue having the largest positive value and another of the eigenvalues is greater than a predefined threshold. In some example embodiments, this determination may be repeated for the ratios between the largest positive eigenvalue and each of the other eigenvalues calculated in operation 810. The processor 110, memory 112, and/or gesture recognizer 120 may, for example, provide means for performing operation 820. If it is determined at operation 820 that the ratio is not greater than the predefined threshold, operation 830 may comprise eliminating the template gesture from further consideration for recognition of the input gesture. The processor 110, memory 112, and/or gesture recognizer 120 may, for example, provide means for performing operation 830. If, however, it is determined at operation 820 that the ratio is greater than the predefined threshold, operation 840 may comprise determining a rotation matrix based at least in part on the constructed matrix. The processor 110, memory 112, and/or gesture recognizer 120 may, for example, provide means for performing operation 840.

FIG. 9 illustrates a flowchart according to a further example method for facilitating gesture recognition according to some example embodiments. The operations illustrated in and described with respect to FIG. 9 may, for example, be performed by, with the assistance of, and/or under the control of one or more of the processor 110, memory 112, communication interface 114, user interface 116, gesture sensor 118, or gesture recognizer 120. Operation 900 may comprise comparing a property of an input gesture to a property of a template gesture. The processor 110, memory 112, and/or gesture recognizer 120 may, for example, provide means for performing operation 900. Operation 910 may comprise determining whether the comparison satisfies a predefined threshold. The processor 110, memory 112, and/or gesture recognizer 120 may, for example, provide means for performing operation 910. If it is determined at operation 910 that the comparison does not satisfy the predefined threshold, the method may proceed to operation 990, in which the template gesture may be eliminated from further consideration for recognition of the input gesture. The processor 110, memory 112, and/or gesture recognizer 120 may, for example, provide means for performing operation 990.

If, however, it is determined in operation 910 that the comparison does satisfy the predefined threshold, the method may proceed to operation 920, which may comprise constructing a matrix based at least in part on the input gesture and the template gesture. For example, operation 920 may comprise calculating the matrix C and/or the matrix M, as described above in Operation 2.2 and Operation 2.3. The processor 110, memory 112, and/or gesture recognizer 120 may, for example, provide means for performing operation 920. Operation 930 may comprise determining a relationship based at least in part on the constructed matrix. The processor 110, memory 112, and/or gesture recognizer 120 may, for example, provide means for performing operation 930. Operation 940 may comprise determining whether the relationship satisfies a predefined threshold. The processor 110, memory 112, and/or gesture recognizer 120 may, for example, provide means for performing operation 940. If it is determined at operation 940 that the relationship does not satisfy the predefined threshold, the method may proceed to operation 990, in which the template gesture may be eliminated from further consideration for recognition of the input gesture.

If, however, it is determined at operation 940 that the relationship does satisfy the predefined threshold, the method may proceed to operation 950, which may comprise determining a rotation matrix based at least in part on the constructed matrix. The processor 110, memory 112, and/or gesture recognizer 120 may, for example, provide means for performing operation 950. Operation 960 may comprise using the rotation matrix to rotate the template gesture to a coordinate system of the input gesture. The processor 110, memory 112, and/or gesture recognizer 120 may, for example, provide means for performing operation 960. Operation 970 may comprise determining whether a pairwise distance between the rotated template gesture and the input gesture satisfies a predefined threshold. The processor 110, memory 112, and/or gesture recognizer 120 may, for example, provide means for performing operation 970. If, it is determined at operation 970 that the pairwise distance does not satisfy the predefined threshold, the method may proceed to operation 990, in which the template gesture may be eliminated from further consideration for recognition of the input gesture. If, however, it is determined at operation 970 that the pairwise distance does satisfy the predefined threshold, the method may proceed to operation 980, which may comprise using a gesture recognition classifier to determine whether the input gesture matches the template gesture based at least in part on a comparison between the rotated template gesture and the input gesture. The processor 110, memory 112, and/or gesture recognizer 120 may, for example, provide means for performing operation 980.

Referring now to FIG. 10, FIG. 10 illustrates a flowchart according to yet another example method for facilitating gesture recognition according to some example embodiments. In this regard, FIG. 10 illustrates operations 1000-1050, one or more of which may be performed following operation 950 as illustrated in FIG. 9 and described above in lieu of one or more of operations 960-990. The operations illustrated in and described with respect to FIG. 10 may, for example, be performed by, with the assistance of, and/or under the control of one or more of the processor 110, memory 112, communication interface 114, user interface 116, gesture sensor 118, or gesture recognizer 120. Operation 1000 may comprise using the rotation matrix (e.g., the rotation matrix determined in operation 950) to rotate a gravity vector associated with the template gesture to a coordinate system of the input gesture. The processor 110, memory 112, and/or gesture recognizer 120 may, for example, provide means for performing operation 1000. Operation 1010 may comprise determining whether an angle between the rotated gravity vector and a gravity vector associated with the input gesture satisfies a predefined threshold. The processor 110, memory 112, and/or gesture recognizer 120 may, for example, provide means for performing operation 1010. If it is determined at operation 1010 that the angle does not satisfy the predefined threshold, the method may proceed to operation 1050, which may comprise eliminating the template gesture from further consideration for recognition of the input gesture. The processor 110, memory 112, and/or gesture recognizer 120 may, for example, provide means for performing operation 1050.

If, however, it is determined at operation 1010 that the angle does satisfy the predefined threshold, the method may proceed to operation 1020, which may comprise using the rotation matrix to rotate the template gesture to a coordinate system of the input gesture. The processor 110, memory 112, and/or gesture recognizer 120 may, for example, provide means for performing operation 1020. Operation 1030 may comprise determining whether a pairwise distance between the rotated template gesture and the input gesture satisfies a predefined threshold. The processor 110, memory 112, and/or gesture recognizer 120 may, for example, provide means for performing operation 1030. If, it is determined at operation 1030 that the pairwise distance does not satisfy the predefined threshold, the method may proceed to operation 1050, in which the template gesture may be eliminated from further consideration for recognition of the input gesture. If, however, it is determined at operation 1030 that the pairwise distance does satisfy the predefined threshold, the method may proceed to operation 1040, which may comprise using a gesture recognition classifier to determine whether the input gesture matches the template gesture based at least in part on a comparison between the rotated template gesture and the input gesture. The processor 110, memory 112, and/or gesture recognizer 120 may, for example, provide means for performing operation 1040.

FIGS. 7-10 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a gesture recognition apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a gesture recognition apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    constructing a matrix based at least in part on an input gesture and a template gesture;
    determining, by a processor, whether a relationship determined based at least in part on the constructed matrix satisfies a predefined threshold;
    in an instance in which the relationship does not satisfy the predefined threshold, eliminating the template gesture from further consideration for recognition of the input gesture; and
    in an instance in which the relationship satisfies the predefined threshold, determining a rotation matrix based at least in part on the constructed matrix.

2. The method of claim 1, further comprising:
    calculating a plurality of eigenvalues based at least in part on the constructed matrix; and
    wherein determining whether a relationship determined based at least in part on the constructed matrix satisfies a predefined threshold comprises determining whether a relationship between the eigenvalues satisfies a predefined threshold.

3. The method of claim 2, wherein determining whether a relationship between the eigenvalues satisfies the predefined threshold comprises determining whether a ratio between the eigenvalue having the largest positive value and another of the eigenvalues is greater than the predefined threshold.

4. The method of claim 1, wherein determining the rotation matrix comprises:
    determining the eigenvector of the constructed matrix having the largest positive eigenvalue as a unit quaternion; and
    determining the rotation matrix represented by the unit quaternion.

5. The method of claim 1, further comprising:
    prior to constructing the matrix, comparing a property of the input gesture to a property of the template gesture; and
    wherein constructing the matrix comprises constructing the matrix only in an instance in which the comparison between the property of the input gesture and the property of the template gesture satisfies a second predefined threshold.

6. The method of claim 5, wherein comparing a property of the input gesture to a property of the template gesture comprises comparing one or more of a length, rate, or acceleration of the input gesture to a respective one or more of a length, rate, or acceleration of the template gesture.

7. The method of claim 1, further comprising, in an instance in which the relationship satisfies the predefined threshold:
    using the rotation matrix to rotate a gravity vector associated with the template gesture to a coordinate system of the input gesture;
    comparing the rotated gravity vector associated with the template gesture to a gravity vector associated with the input gesture to determine whether an angle between the rotated gravity vector associated with the template gesture and the gravity vector associated with the input gesture satisfies a second predefined threshold; and
    eliminating the template gesture from further consideration for recognition of the input gesture in an instance in which the angle does not satisfy the second predefined threshold.

8. The method of claim 1, further comprising, in an instance in which the relationship satisfies the predefined threshold:
    using the rotation matrix to rotate the template gesture to a coordinate system of the input gesture;
    calculating a pairwise distance based at least in part on the rotated template gesture and the input gesture;
    determining whether the pairwise distance satisfies a second predefined threshold; and
    eliminating the template gesture from further consideration for recognition of the input gesture in an instance in which the pairwise distance does not satisfy the second predefined threshold.

9. The method of claim 1, further comprising:
    using a gesture recognition classifier to determine whether the input gesture matches the template gesture in an instance in which the template gesture is not eliminated from further consideration for recognition of the input gesture.

10. The method of claim 1, further comprising repeating the constructing and determining for each of a plurality of template gestures, thereby filtering out template gestures that fail to satisfy the predefined threshold.

11. An apparatus comprising at least one processor and at least one memory storing computer program code, wherein the at least one memory and stored computer program code are configured, with the at least one processor, to cause the apparatus to at least:
construct a matrix based at least in part on an input gesture and a template gesture;
determine whether a relationship determined based at least in part on the constructed matrix satisfies a predefined threshold;
in an instance in which the relationship does not satisfy the predefined threshold, eliminate the template gesture from further consideration for recognition of the input gesture; and
in an instance in which the relationship satisfies the predefined threshold, determine a rotation matrix based at least in part on the constructed matrix.

12. The apparatus of claim 11, wherein the at least one memory and stored computer program code are configured, with the at least one processor, to further cause the apparatus to:
calculate a plurality of eigenvalues based at least in part on the constructed matrix;
determine whether a relationship determined based at least in part on the constructed matrix satisfies a predefined threshold at least in part by determining whether a relationship between the eigenvalues satisfies a predefined threshold.

13. The apparatus of claim 12 wherein the at least one memory and stored computer program code are configured, with the at least one processor, to cause the apparatus to determine whether a relationship between the eigenvalues satisfies the predefined threshold at least in part by determining whether a ratio between the eigenvalue having the largest positive value and another of the eigenvalues is greater than the predefined threshold.

14. The apparatus of claim 11, wherein the at least one memory and stored computer program code are configured, with the at least one processor, to cause the apparatus to determine the rotation matrix at least in part by:
determining the eigenvector of the constructed matrix having the largest positive eigenvalue as a unit quaternion; and
determining the rotation matrix represented by the unit quaternion.

15. The apparatus of claim 11, wherein the at least one memory and stored computer program code are configured, with the at least one processor, to further cause the apparatus to:
prior to constructing the matrix, compare a property of the input gesture to a property of the template gesture; and
construct the matrix only in an instance in which the comparison between the property of the input gesture and the property of the template gesture satisfies a second predefined threshold.

16. The apparatus of claim 11, wherein, in an instance in which the relationship satisfies the predefined threshold, the at least one memory and stored computer program code are configured, with the at least one processor, to further cause the apparatus to:
use the rotation matrix to rotate a gravity vector associated with the template gesture to a coordinate system of the input gesture;
compare the rotated gravity vector associated with the template gesture to a gravity vector associated with the input gesture to determine whether an angle between the rotated gravity vector associated with the template gesture and the gravity vector associated with the input gesture satisfies a second predefined threshold; and
eliminate the template gesture from further consideration for recognition of the input gesture in an instance in which the angle does not satisfy the second predefined threshold.

17. The apparatus of claim 11, wherein, in an instance in which the relationship satisfies the predefined threshold, the at least one memory and stored computer program code are configured, with the at least one processor, to further cause the apparatus to:
use the rotation matrix to rotate the template gesture to a coordinate system of the input gesture;
calculate a pairwise distance based at least in part on the rotated template gesture and the input gesture;
determine whether the pairwise distance satisfies a second predefined threshold; and
eliminate the template gesture from further consideration for recognition of the input gesture in an instance in which the pairwise distance does not satisfy the second predefined threshold.

18. The apparatus of claim 11, wherein the at least one memory and stored computer program code are configured, with the at least one processor, to further cause the apparatus to:
use a gesture recognition classifier to determine whether the input gesture matches the template gesture in an instance in which the template gesture is not eliminated from further consideration for recognition of the input gesture.

19. The apparatus of claim 11, wherein the apparatus comprises or is embodied on a mobile phone, the mobile phone comprising user interface circuitry and user interface software stored on one or more of the at least one memory; wherein the user interface circuitry and user interface software are configured to:
facilitate user control of at least some functions of the mobile phone through use of a display; and
cause at least a portion of a user interface of the mobile phone to be displayed on the display to facilitate user control of at least some functions of the mobile phone.

20. A computer program product comprising at least one non-transitory computer-readable storage medium having computer-readable program instructions stored therein, the computer-readable program instructions comprising:
program instructions configured to construct a matrix based at least in part on an input gesture and a template gesture;
program instructions configured to calculate a plurality of eigenvalues based at least in part on the constructed matrix;
program instructions configured to determine whether a relationship between the eigenvalues satisfies a predefined threshold;
program instructions configured, in an instance in which the relationship does not satisfy the predefined threshold, to eliminate the template gesture from further consideration for recognition of the input gesture; and program instructions configured, in an instance in which the relationship satisfies the predefined threshold, to determine a rotation matrix based at least in part on the constructed matrix.

* * * * *